Dec. 17, 1968  E. L. CHRISTIAN  3,417,225
AUTOMATIC FRICTIONLESS GUIDED WELDING APPARATUS
Filed Aug. 9, 1965  3 Sheets-Sheet 1

INVENTOR.
EARL L. CHRISTIAN
BY *Earl F. Krotts*
ATTORNEY
*Nicolas A. Vaz*
AGENT

Dec. 17, 1968  E. L. CHRISTIAN  3,417,225
AUTOMATIC FRICTIONLESS GUIDED WELDING APPARATUS
Filed Aug. 9, 1965  3 Sheets-Sheet 2

INVENTOR.
EARL L. CHRISTIAN
BY
ATTORNEY
AGENT

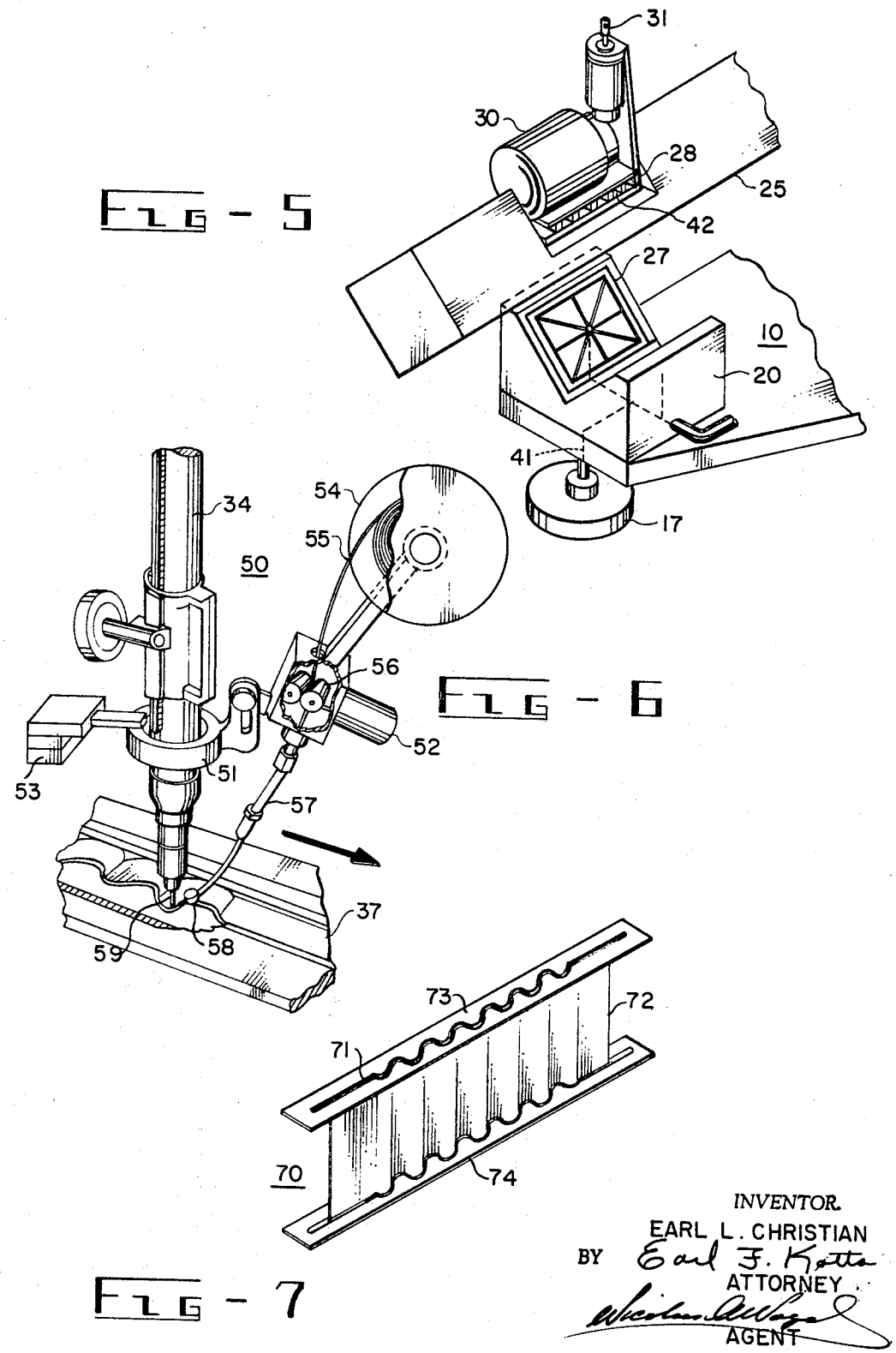

United States Patent Office 3,417,225
Patented Dec. 17, 1968

3,417,225
AUTOMATIC FRICTIONLESS GUIDED
WELDING APPARATUS
Earl L. Christian, San Diego, Calif., assignor to General
Dynamics Corporation, San Diego, Calif., a corporation of Delaware
Filed Aug. 9, 1965, Ser. No. 478,105
9 Claims. (Cl. 219—125)

ABSTRACT OF THE DISCLOSURE

A welding apparatus horizontally movable in two directions; one at right angles to the other. A carriage is supported on air bearings for movement in a longitudinal direction. A vertically disposed welding torch mounted on a cross bar is supported for movement in a transverse direction on air bearings fixed to the carriage. A motor mounted on the cross bar rotates a magnetic tracing wheel engaged with a template. Transverse movement of the cross bar and its associated welding torch is effected by the force of the tracing wheel in magnetic contact with the contoured edge of the template. A welding wire spool and motor assembly journalled on the welding torch, feeds and directs weld wire to the workpiece at the torch tip.

---

This invention relates to a frictionless guided welding apparatus and in particular to a welding apparatus with an air bearing two-axes guidance system especially suited for welding thin foil materials or the like.

Typical of developments, which present new joining problems, are foil type of materials used for strong but light structures. Due to the very thin dimensions of the metals to be welded it becomes very difficult, if not impossible, to avoid burn-through or unacceptable weld seams. A recent engineering request for welding sine wave spars, having a corrugated shaped foil material used as stem or web, created a need for a two-axes guidance system to control the path of the welding torch when traveling along a sine wave or corrugated path in a horizontal plane. The prior art includes welding apparatus which electronically traces template by use of a photo-cell, thereby obtaining signal information, which is fed through other electronic circuitry and thereafter actuates the welding torch to move along a similar line as traced by the photo-cell. A two sine wave or other complicated configuration can be followed by this apparatus. However, under-fusion, burn-through welding and misformed welds are experienced. It was noted that small errors in electronic components, in the synchronizing and computer circuits, as well as vibrations of other surrounding machinery, prevented the desired thin foil welding to be performed to the required standards.

The integrated two-axes air bearing system and wire feeding apparatus as presented by this invention solves several problems experienced by the prior art.

It is therefore an object of the present invention to provide a welding apparatus having an air bearing carriage and tracer and which apparatus is capable of welding sine wave or other configurations for unlimited length.

It is another object of the present invention to provide a welding apparatus wherein air bearings are provided for eliminating vibrations from associated machinery thereby allowing smoother and more reliable uniform welds.

It is another and important object of the disclosed invention to provide an automatic feeding filler wire means operative during the welding process so that welding is completed in a one step operation providing a smooth weld bead and thus eliminating machine finishing operation thereafter.

Furthermore, the present invention provides a unique welding method and apparatus for welding thin foil material along complex designs and configurations while simultaneously obtaining a reliable smooth weld.

Other objects of the invention will become apparent from the following description taken in conjunction with the accompanying drawings in which:

FIGURE 5 shows a disassembled view of the carriage first base and second base and the air bearing connection therein between, as well as the air supply line to the air bearings in phantom lines.

FIGURE 6 shows the automatic welding wire feeding apparatus with its attachments to the welding torch.

FIGURE 7 shows a typical welded sine wave spar of a thin foil material.

Figure 1:
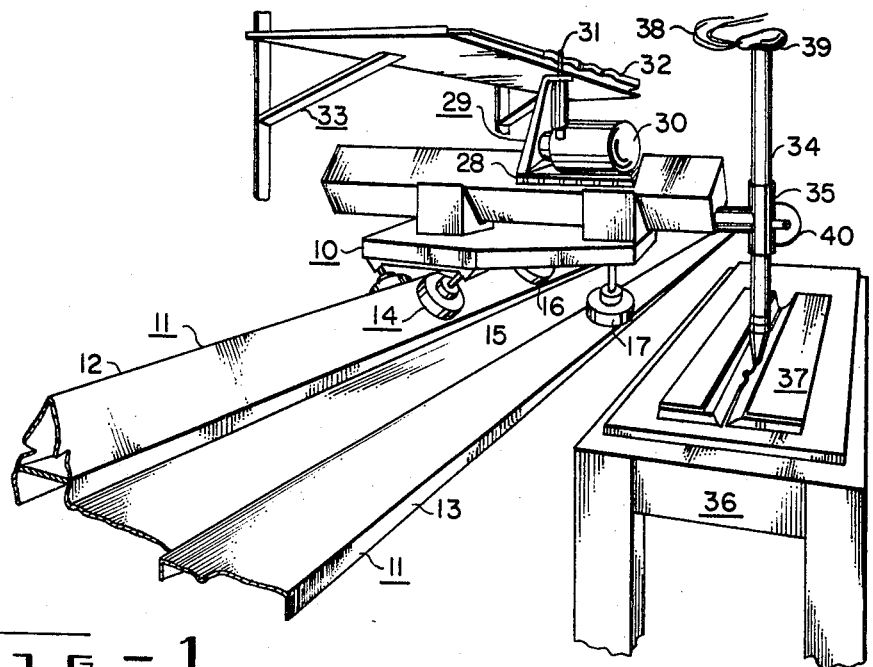
FIGURE 1 shows, in perspective fashion, the welding apparatus and its basic mechanical construction.

In general, the frictionless tracer and welding apparatus with its automatic synchronized wire feeding means comprises the following elements;

Tracer means mounted on a carriage which is provided with frictionless means or air bearing means for displacement of the carriage along two substantial perpendicular axes in a horizontal plane. Welding means are mounted on the carriage and thus follow the displacement of the carriage along the two axes induced by the tracing movements of the tracer means;

And a wire feeding apparatus comprising a ball bearing means mounted about the welding torch for free rotation of a thereon mounted motor for feeding welding wire to the welding work piece through a longitudinal guide means mounted on the motor. The slide means is provided with an element which slides along the welding fixture ahead of the welding torch.

Reference is now made to the drawings wherein like reference characters designate corresponding parts throughout the several views.

FIGURE 1 shows a frictionless guided welding apparatus in a perspective fashion. A carriage means 10 is located on a track means 11 which comprises V track 12 and a flat track 13. The carriage means 10 rests upon the track means 11 by the use of circular air bearings or air bearing means 14. The air bearing means 14 supporting the carriage 10, comprises two pair of angular positioned disc air bearings 15 and 16 disposed on said V track 12 and one horizontal air disc bearing 17 disposed on the flat track 13.

Figure 4:
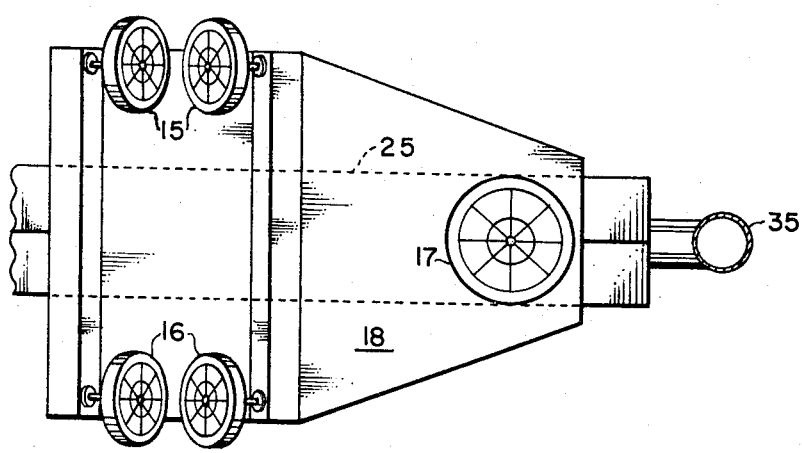
FIGURE 4 shows the underside of the carriage taken along line 4—4 of FIGURE 2.
Figure 2:
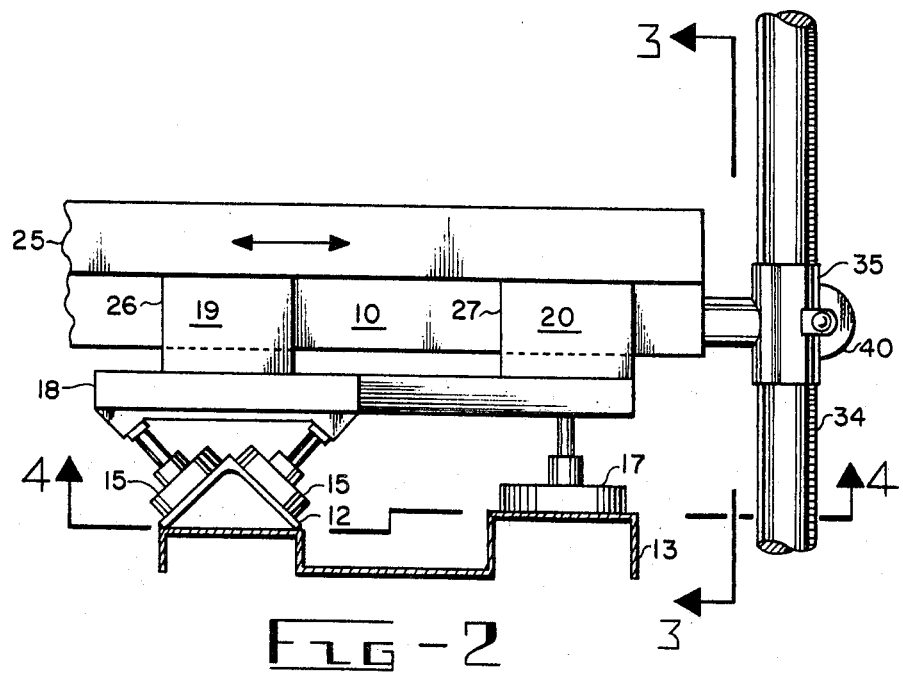
FIGURE 2 shows an orthographic side view of the carriage suspended on its track.
Figure 3:
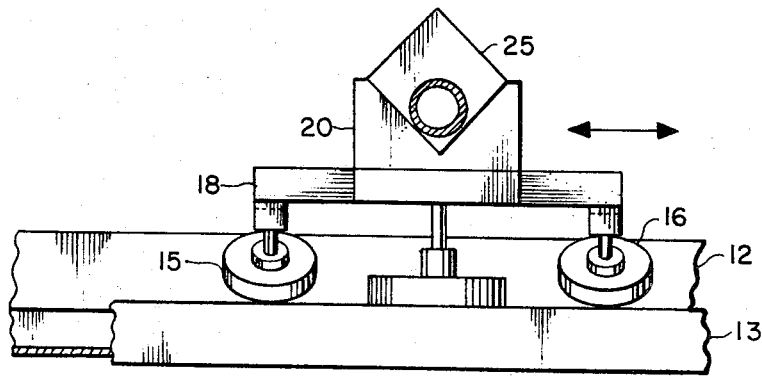
FIGURE 3 shows a side view of FIGURE 2 taken along line 3—3.

By referring to FIGURES 2, 3 and 4, a complete understanding of the carriage construction and operation can be obtained. The carriage 10 has two major parts. The first part is a first base 18 having a pair of bearing support brackets 19 and 20. The first base or carriage plate 18 has more or less a triangular horizontal configuration. The second part of the carriage 10 comprises a second base or cross feed slide bar 25 which rests in the bearing support brackets 19 and 20. Both bearing support brackets 19 and 20 are provided with V air bearings 26 and 27, respectively. A mounting plate 28 for tracer means or the tracer motor unit 29 is located on the upper area of the cross feed slide bar 25. See FIGURES 1 and 5.

The tracer means 29 includes a motor 30, a magnetic drive wheel 31 and an adjusting speed control which is not shown in the illustrated figures. An associated template 32 is disposed, by a bracket construction means 33, adjacent and in alignment with the magnetic drive wheel 31.

A welding torch 34 is mounted with torch holder 35 on the cross feed slide bar 25 as shown in FIGURE 1 and FIGURE 2. A table 36 is located in alignment with the welding torch 34. A welding fixture 37 is mounted on the table top. Input wires 38 are connected by a swivable bearing mounted guide means 39 on top of the welding torch 34.

FIGURE 2 shows a side view of the carriage 10 and in particular illustrates the angle of the first pair of disc shaped air bearings 15 disposed on the V track 12. The torch holder 35 is shown to be mounted on the cross feed slide bar 25 and is equipped with a fine height adjusting means 40.

FIGURE 3 shows a side view taken along the vertical line 3—3 of FIGURE 2. The two-pointed arrow illustrated in FIGURE 2 relates to the two directions of movement possible by the cross feed slide bar 25 or second base of the carriage 10, while the two-pointed arrow in FIGURE 3 relates to the second axis of movement of the carriage 10, made possible by the frictionless suspension means of the first base or carriage plate 18 in both directions along the track means 11.

FIGURE 4 is a view taken from underneath the carriage 10 and especially shows the air bearing construction and arrangement. The first pair of angle discs air bearings 15 and the second pair of angle discs air bearings 16 together with the horizontal air bearing discs 17 establish horizontal guided alignment of the carriage 10.

FIGURE 5 shows a disassembled view of the bearing support bracket 19 and its V air bearing 27. Conduit means 41 supply air or inert gas to the V shaped bearing 26. The horizontal air bearing discs 17 are shown in phantom lines. The tracer motor unit 29 is shock mounted by rubber strips 42 positioned under the mounting plate 28.

FIGURE 6 shows, perspectively, the wire feeding means 50. A ball bearing 51 is mounted with its inner race about the welding torch 34. Its outer race is provided with a bracket holding electric motor 52, and on the opposite side, with a bracket holding a cantilever weight 53. The electric motor 52 has a bracket on its upper surface which supports a spool 54 wound with welding wire 55. The open cut section through motor 52 shows two serrated guiding and pulling wheels 56 which are activated by the motor 52. A tube 57 is mounted on the motor 52 and provided with a half spherical shaped sliding element 58. The welding wire 55 is guided through the sliding element 58 directly underneath the electrode 59 of the welding torch 34.

FIGURE 7 portrays a welded spar section 70, which is of a titanium material 0.010 inch to about 0.040 inch thick. The weld bead 71 is flush and smooth on the upper flange and lower flange and the corrugated web 72 is reliably and strongly connected therewithin.

Having thus described the different parts and their function by reference characters, the operation of the present invention is as follows:

Assuming that all of the bearing means 14 are pressurized, by controlled pressure to all bearings from a manifold system, not shown in the described figures, the carriage and cross feed slide bar 25 are supported and free floating on a thin layer of gas. Thus, frictionless support and travel of the carriage plate 18 in the longitudinal direction, and frictionless transverse support and travel of the slide bar 25 of the carriage 10 in the transverse direction is achieved. Movements of the carriage 10 in a horizontal plane in all directions is hereby accomplished.

The free floating two-axes air bearing system for carriage 10 is driven by the magnetic wheel 31, activated by the motor 30, which wheel 31 in turn is tracing the steel sine wave template 32. The sine wave template 32 is duplicated by the welding torch 34 which is mounted to the carriage 10, as it welds the flange 73 and corrugated web 72 together.

The rotation speed of the magnetic tracing wheel 31 and the moving speed of the welding torch 34, are in synchronized relationship to one another controlled by adjusting means on motor 30.

During the welding process, titanium wire 55 or the like is fed into the weld to fill and make the weld bead 71 flush on the upper flange 73 or lower flange 74. The miniature wire feeder motor 52 is pivoted about the center of the torch holder 35 on a precision ball bearing 51. The sliding element 58 traces the weld path by sliding along the groove of the welding fixture 37 ahead of the welding torch 34. Thus, wire 55 is automatically fed into the molten weld of metal normal to the sine wave configuration, as the torch 34 moves along its controlled path. See FIGURE 6.

By changing the welding fixture 37 and tracing template 32, other configurations may be welded such as straight line, zig-zag, irregular curves, etc.

It should further be noted that the air bearing carriage 10 avoids mechanical linkage of a pantograph system and is capable of welding sine wave or other configurations for hundreds of feet by simply adding more tracks to the track means 11.

Conventional welding equipment such as gas flame cutting, mig or tig welding is readily adaptable to the two-axes air bearing system. Vibrations which are transmitted from other equipment and factory floor machinery are prevented from penetrating toward the welding torch 34. By dumping out these vibrations through the gas bearings means 14, a smoother and more uniform weld, having a high reliability, is produced.

Furthermore, because of the steady movement of the welding torch, without any trembling or vibrations, burn-through welds in cases of thin foil welding procedures are eliminated. Exact tracing of the template 32 is obtained by the magnetic drive wheel 31, which is linked through one integral, non-flexible metal structure, comprising the cross feed slide bar 25 and welding torch 34. It can be stated therefore that exact tracing within a tolerance of less than a ten thousandth of an inch is hereby presented.

By automatically in a synchronized manner feeding the filler wire 55 during the welding process, the weld is completed in one pass. The weld bead 71 is flush with the upper flange 73 or lower flange 74 and does not require machine finishing afterwards.

It should be understood that the ball bearing means 51 mentioned in the wire feeding apparatus 50 may be an air bearing means interconnected with the same manifold system as the other air bearings in the welding apparatus. Also the anti-vibration feature of the welding apparatus could be increased by an air bearing mounting system supporting the track means 11 integrally with table 36.

It has been proven and tested that the weld obtained by this method and this apparatus is far more consistent and reliable, because a complete fusion of the material in an even smooth pattern is achieved and deformation of the material is kept to a minimum.

Although particular embodiments of the invention have been illustrated and described, it will be obvious to those skilled in the art that various changes and modifications may be made without departing from the invention, and it is intended to cover in the appended claims all such changes and modifications that come within the spirit and scope of the invention.

I claim:

1. Frictionless guided welding apparatus comprising in combination:
   (a) carriage means having a first base means and a second base means,
   (b) welding means mounted on said second base means,
   (c) track means,
   (d) air bearing means mounted on said first base means for frictionless arrangement between said first base means and said track means and between said first base means and said second base means, (e) said carriage means arranged to move in a substantial horizontal straight axis along said track means supported by air from said air bearing means mounted on said first base for frictionless movement between said first base and said track means, (f) said second base being supported by air from said air bearing means mounted on said first base for frictionless movement between said first base and said second base to move along a substantially horizontal axis being substantially perpendicular with said substantially horizontal straight axis, (g) tracer means mounted on said second base means for tracing an associated adjacently positioned metal template to be duplicated by said welding means, (h) said metal template being fixed against movement relative to said track means, (i) said tracer means comprising a magnetic tracer wheel and tracer motor means, and, (j) said tracer motor means adapted to rotate said tracer wheel so that said tracer wheel rides along said associated metal template thereby tracing said template configuration and transmitting its travel motion in its horizontal plane, via said carriage means to said welding means.

2. The apparatus as claimed in claim 1 wherein said welding means is provided with height adjusting means and swivel means, said swivel means arranged for guiding input means for activating of said welding means torch section.

3. A frictionless guided welding apparatus comprising in combination:

(a) a carriage having a first base and a second base, (b) a welding torch mounted on said second base of said carriage, (c) tracer means mounted on said second base of said carriage, (d) track means supporting said carriage, (e) air bearing means comprising a first plurality of air bearings and a second air bearing support, (f) said first base having said first plurality of air bearings pivotally mounted thereon in alignment with said track means for horizontal support thereof, (g) bracket means mounted on said first base provided with said second air bearing support adapted to support said second base so that said second base when said second air bearing means is pressurized will float along a substantial horizontal axis substantially perpendicular with respect to the longitudinal axis of said track means, and, (h) said tracer means comprising a motor and magnetic tracer wheel connected with said motor for rotation of said wheel along an associated adjacent stationary positioned template having a desired path to be copied by said welding torch.

4. Automatic guided welding apparatus for welding of thin foil metal materials comprising in combinttion:

(a) welding means mounted to a carriage means, (b) track means for support of said carriage means in a horizontal plane, (c) air bearings mounted on said carriage means for frictionless supporting movement thereof on said track means, (d) tracer means mounted on said carriage means for tracing an associated desired design so that movement of said tracing means is transferred simultaneously to said welding means through said carriage means, (e) bearing means mounted on said welding means, (f) motor means rotationally supported on said welding means by said bearing means, (g) weld wire guiding means, having a sliding means, mounted on said motor means for ejecting weld wire in front of said welding means into the point of weld, and, (h) wire pulling means connected with and driven by said motor means for transporting wire through said guiding means at a speed synchronized with said tracer means tracing movement.

5. Automatic frictionless guided welding apparatus for welding of thin foil metals with a smooth even bead, comprising in combination:

(a) welding means mounted to a carriage means, (b) said carriage means having a first base means and a second base means, (c) track means, (d) air bearing means mounted on said first base means for frictionless arrangement between said first base means and said track means and between said first base means and said second base means, (e) tracer means mounted on said second base means for tracing a desired associated design configuration path to be duplicated by said welding means simultaneously, (f) a ball bearing having an inner race and an outer race, (g) said inner race mounted about said welding means, (h) said outer race comprising a support for a motor assembly mounted thereon, (i) said motor assembly including a wire pulling means connected with a motor for activation, a spool with welding wire mounted on one side of said wire pulling means, and a wire guiding tube with sliding element mounted on the other side of said wire pulling means, (j) said sliding element positioned in front of said welding means in such a way that welding wire be ejected at said welding means associated electrode spark at all times and whereby said sliding element is adapted to travel in front of said welding means guided by sliding along an associated welding fixture, and (k) said spool adapted to unroll welding wire when said motor is being energized thereby activating said wire pulling means so that wire is pulled through said wire pulling means and transported through said guiding tube and sliding element for ejecting into said spark.

6. Automatic frictionless guided welding apparatus having a welding torch and fixture for welding of thin foil metals along complex curved configurations with a smooth even bead, comprising in combination:

(a) welding means mounted to a carriage, (b) said carriage having a first base means and a second base means, (c) track means, (d) air bearing means mounted on said first base means for frictionless arrangement between said first base means and said track means and between said first base means and said second base means, (e) tracer means mounted on said second base means for tracing an associated adjacently positioned metal template to be duplicated by said welding means, (f) said tracer means comprising a magnetic tracer wheel and tracer motor means, (g) said tracer motor means adapted to rotate said tracer wheel so that said tracer wheel rides along said associated metal template thereby tracing said template configuration and transmitting its travel motion in a horizontal plane, via said carriage means to said welding means, (h) a ball bearing means mounted about said welding torch, (i) welding wire feeding means assembly mounted on said ball bearing means for free swivel movement about said welding torch, (j) said welding wire feeding means including a motor, a wire pulling means to be activated by said motor for transporting welding wire toward the point of weld, (k) a guiding tube with sliding element mounted on said assembly whereby said wire is guided, when said wire pulling means is activated, through said tube and ejected from said element, and (l) said element positioned in front of said moving torch sliding and guiding itself along said welding fixture.

7. Automatic frictionless guided welding apparatus having a welding torch and welding fixture for welding thin foil metals along complex curved configurations with a smooth even bead comprising in combination:

(a) carriage having a first base means and a second base, (b) track means including a rail configuration for directing said carriage in a straight horiozntal plane, (c) first air bearing means mounted on said first base means for frictionless supporting arrangement between said first base means and said track means along a straight axis on a substantial horizontal plane, (d) second air bearing means mounted on said first base means for frictionless arrangement between said first base means and said second base means along an axis substantial perpendicular with said straight axis and on said substantial horizontal plane, (e) tracer means mounted on said second base means for tracing an associated adjacently positioned metal template to be duplicated by said welding means, (f) said tracer means comprising a magnetic tracer wheel and tracer motor means, (g) said tracer motor means adapted to rotate said tracer wheel so that said tracer wheel rides along said associated metal template thereby tracing said template configuration and transmitting its travel motion in its horizontal plane, via said carriage means to said welding means, (h) a ball bearing means mounted about said welding torch, (i) welding wire feeding means mounted on said ball bearing means for free swivel movement about said welding torch, (j) said wire feeding means including a motor, a wire pulling means, to be activated by said motor, (k) a guiding tube with sliding element mounted on said wire feeding means whereby said wire is guided, when said wire pulling means is activated, through said tube and ejected from said element into the point of weld, (l) said element arranged for sliding and guiding itself along said welding fixture in front of said moving welding torch, and (m) wherein said motor of said wire feeding means is provided with a speed control adjusting means so that desired synchronization of said wire feeding and said torch movement can be accomplished by said speed control adjusting means.

8. A welding apparatus comprising:

(a) track means, (b) carriage means, (c) bearings on said carriage means for supporting said carriage means on said track means for movement in a horizontal plane, (d) cross feed means, (e) bearings on said carriage means for supporting said cross feed means thereon, (f) said cross feed means being movable on said bearings in a horizontal plane substantially perpendicular to the movement of said carriage means, (g) tracer means mounted on said cross feed means, (h) said tracer means comprising a magnetic tracer wheel and tracer motor means, (i) said magnetic tracer wheel being rotatable by said tracer motor means to follow the contour of a metal template, (j) said magnetic tracer wheel being maintained against said metal template by magnetic force, (k) welding means mounted on said cross feed means, and, (l) said welding means being moved to follow the contour of said template by initiating movement of said tracer wheel along said template.

9. The welding apparatus of claim 8 wherein a bearing rotationally supports a motor driven weld wire guiding and feeding means on said welding apparatus for guiding and feeding said weld wire into the point of weld.

References Cited

UNITED STATES PATENTS

| | | | |
|---|---|---|---|
| 2,927,992 | 3/1960 | Bateman | 219—125 |
| 2,942,385 | 6/1960 | Pal. | |
| 3,037,888 | 6/1962 | Lobosco et al. | 219—125 |
| 3,162,161 | 12/1964 | Verbeek | 219—125 |
| 3,171,012 | 2/1965 | Morehead | 219—124 |
| 3,201,562 | 8/1965 | Anderson | 219—125 |
| 3,231,319 | 1/1966 | Porath | 308—5 |
| 3,266,854 | 8/1966 | Aller | 308—5 |
| 3,325,229 | 6/1967 | Webb | 308—5 |
| 3,355,990 | 12/1967 | Thum | 308—5 |
| 2,066,163 | 12/1936 | Stephens et al. | 314—69 |
| 2,644,070 | 6/1953 | Herbst | 219—130 |

RICHARD M. WOOD, *Primary Examiner.*

W. DEXTER BROOKS, *Assistant Examiner.*

U.S. Cl. X.R.

308—5